(12) United States Patent
Van Duijneveldt

(10) Patent No.: US 8,525,444 B2
(45) Date of Patent: Sep. 3, 2013

(54) LIGHTING DEVICE WITH MULTIPLE PRIMARY COLORS

(75) Inventor: Wido Van Duijneveldt, Geldrop (NL)

(73) Assignee: Koninklijke Philips N.V., Eindhoven (NL)

( * ) Notice: Subject to any disclaimer, the term of this patent is extended or adjusted under 35 U.S.C. 154(b) by 624 days.

(21) Appl. No.: 12/519,187

(22) PCT Filed: Dec. 17, 2007

(86) PCT No.: PCT/IB2007/055176
§ 371 (c)(1),
(2), (4) Date: Jun. 15, 2009

(87) PCT Pub. No.: WO2008/078274
PCT Pub. Date: Jul. 3, 2008

(65) Prior Publication Data
US 2010/0060185 A1  Mar. 11, 2010

(30) Foreign Application Priority Data
Dec. 20, 2006  (EP) ................................. 06126588

(51) Int. Cl.
*H05B 37/02* (2006.01)
(52) U.S. Cl.
USPC ........................................ 315/308; 315/312
(58) Field of Classification Search
USPC ............. 315/312, 185 R, 291–295, 307, 308, 315/324
See application file for complete search history.

(56) References Cited

U.S. PATENT DOCUMENTS

| | | | |
|---|---|---|---|
| 6,014,457 A | 1/2000 | Kubo et al. | |
| 6,897,876 B2* | 5/2005 | Murdoch et al. | 345/589 |
| 6,950,110 B2 | 9/2005 | Falk | |
| 7,333,080 B2* | 2/2008 | Miller et al. | 345/83 |
| 7,598,961 B2* | 10/2009 | Higgins | 345/589 |
| 2002/0047642 A1* | 4/2002 | Miyagawa | 315/307 |
| 2003/0011613 A1 | 1/2003 | Booth | |
| 2003/0128174 A1 | 7/2003 | Scheibe | |
| 2004/0178743 A1* | 9/2004 | Miller et al. | 315/169.3 |

(Continued)

FOREIGN PATENT DOCUMENTS

| | | |
|---|---|---|
| DE | 202006012864 U1 | 11/2006 |
| WO | 2004100611 A1 | 11/2004 |
| WO | 2006062047 A1 | 6/2006 |
| WO | 2006109237 A1 | 10/2006 |

OTHER PUBLICATIONS

Morovic et al: "The Fundamentals of Gamut Mapping: A Survey"; Journal of Imaging Science and Technology, 45/3:283-290 Jul. 2000.

*Primary Examiner* — Jimmy Vu
(74) *Attorney, Agent, or Firm* — Mark L. Beloborodov

(57) ABSTRACT

The invention relates to a lighting device (10) with at least four light emitters (1 IR, 1 IG, 1 IB, 1 IW) of different primary colors that shall be controlled according to given primary target values, for example target values for the color point (x, y) and flux (Φ). This object is achieved by determining secondary target values, for example for the total power consumption (P) of the light emitters, that are in accordance with primary target values and with the possible control commands (r, g, b, w) (e.g. duty cycles between 0% and 100%). By fixing the secondary target values, the control commands for the light emitters can uniquely be determined, in preferred embodiments by a simple matrix multiplication.

9 Claims, 8 Drawing Sheets

(56) References Cited

U.S. PATENT DOCUMENTS

| | | |
|---|---|---|
| 2004/0207341 A1 | 10/2004 | Callahan |
| 2004/0246265 A1 | 12/2004 | Starkweather |
| 2005/0008331 A1 | 1/2005 | Nishimura et al. |
| 2005/0083341 A1 | 4/2005 | Higgins et al. |
| 2006/0237636 A1* | 10/2006 | Lyons et al. .................. 250/228 |
| 2008/0158115 A1* | 7/2008 | Cordes et al. .................. 345/82 |
| 2011/0157245 A1* | 6/2011 | Young .......................... 345/690 |

* cited by examiner $$Y = \Phi; \quad \frac{X}{Y} = \frac{x}{y}; \quad \frac{Z}{Y} = \frac{(1-x-y)}{y} \qquad (1)$$

FIG. 2A $$\begin{pmatrix} X \\ Y \\ Z \\ P \end{pmatrix} = M \cdot \begin{pmatrix} r \\ g \\ b \\ w \end{pmatrix} \qquad (2)$$

FIG. 2B $$\begin{pmatrix} r \\ g \\ b \\ w \end{pmatrix} = M^{-1} \cdot \begin{pmatrix} X \\ Y \\ Z \\ P \end{pmatrix} = \begin{pmatrix} r_X & r_Y & r_Z & r_P \\ g_X & g_Y & g_Z & g_P \\ b_X & b_Y & b_Z & b_P \\ w_X & w_Y & w_Z & w_P \end{pmatrix} \cdot \begin{pmatrix} X \\ Y \\ Z \\ P \end{pmatrix} \qquad (3)$$

FIG. 2C $$\begin{pmatrix} r \\ g \\ b \\ w \end{pmatrix} = \begin{pmatrix} r_P \\ g_P \\ b_P \\ w_P \end{pmatrix} \cdot P + \begin{pmatrix} r_\Phi \\ g_\Phi \\ b_\Phi \\ w_\Phi \end{pmatrix} \cdot \Phi \qquad (4)$$

FIG. 2D $$\begin{pmatrix} r_\Phi \\ g_\Phi \\ b_\Phi \\ w_\Phi \end{pmatrix} = \begin{pmatrix} r_X & r_Y & r_Z \\ g_X & g_Y & g_Z \\ b_X & b_Y & b_Z \\ w_X & w_Y & w_Z \end{pmatrix} \cdot \begin{pmatrix} \frac{x}{y} \\ 1 \\ \frac{(1-x-y)}{y} \end{pmatrix} \qquad (5)$$

FIG. 2E $$\begin{cases} 0 \le r \le 1 \\ 0 \le g \le 1 \\ 0 \le b \le 1 \\ 0 \le w \le 1 \end{cases} \Rightarrow \begin{cases} 0 \le r_P \cdot P + r_\Phi \cdot \Phi \le 1 \\ 0 \le g_P \cdot P + g_\Phi \cdot \Phi \le 1 \\ 0 \le b_P \cdot P + b_\Phi \cdot \Phi \le 1 \\ 0 \le w_P \cdot P + w_\Phi \cdot \Phi \le 1 \end{cases} \qquad (6)$$

FIG. 2F $$\begin{pmatrix} r \\ g \\ b \\ w \end{pmatrix} = \left( \begin{pmatrix} r_P \\ g_P \\ b_P \\ w_P \end{pmatrix} \cdot \frac{P_x}{\Phi_x} + \begin{pmatrix} r_\Phi \\ g_\Phi \\ b_\Phi \\ w_\Phi \end{pmatrix} \right) \cdot \Phi_t \quad \text{with} \quad \frac{P_x}{\Phi_x} = \frac{P_t}{\Phi_t} \qquad (7)$$

FIG. 2G $$\begin{pmatrix} r_t \\ g_t \\ b_t \\ w_t \end{pmatrix} = \begin{pmatrix} r_P \\ g_P \\ b_P \\ w_P \end{pmatrix} \cdot P_t + \begin{pmatrix} r_\Phi \\ g_\Phi \\ b_\Phi \\ w_\Phi \end{pmatrix} \cdot \Phi_t = \begin{pmatrix} r_P \\ g_P \\ b_P \\ w_P \end{pmatrix} \cdot \frac{\Phi_t}{\Phi_x} \cdot P_x + \begin{pmatrix} r_\Phi \\ g_\Phi \\ b_\Phi \\ w_\Phi \end{pmatrix} \cdot \frac{\Phi_t}{\Phi_x} \cdot \Phi_x = \frac{\Phi_t}{\Phi_x} \cdot \begin{pmatrix} r_x \\ g_x \\ b_x \\ w_x \end{pmatrix} \qquad (8)$$

FIG. 2H $$\begin{cases} r_P \cdot P + r_\Phi \cdot \Phi - c_r = 0 \\ g_P \cdot P + g_\Phi \cdot \Phi - c_g = 0 \end{cases} \Rightarrow \begin{cases} P = \dfrac{g_\Phi \cdot c_r - r_\Phi \cdot c_g}{r_P \cdot g_\Phi - r_\Phi \cdot g_P} \\ \Phi = \dfrac{r_P \cdot c_g - g_P \cdot c_r}{r_P \cdot g_\Phi - r_\Phi \cdot g_P} \end{cases} \qquad (9)$$

FIG. 2I $$v_c = \sqrt{(b_p^2 + b_\Phi^2)} \cdot d_f = b_p \cdot P + b_\Phi \cdot \Phi - c_b \qquad (10)$$

FIG. 2J

LIGHTING DEVICE WITH MULTIPLE PRIMARY COLORS

BACKGROUND OF THE INVENTION

The invention relates to a lighting device comprising at least four light emitters with different primary colors and to a method for controlling such a lighting device.

The US 2005/008331 A1 discloses a method to map three color coordinates onto a vector of color coordinates with four or more components comprising white. The method is based on a particular subdivision of the two-dimensional (CIE) chromaticity diagram into triangular regions and does not pay attention to an optimized control of associated light emitters.

BRIEF SUMMARY OF THE INVENTION

Based on this situation it was an object of the present invention to provide alternative means for controlling at least four light emitters with different colors, wherein it is desirable that the control is fast and/or that certain optimization criteria can be fulfilled.

This object is achieved by a lighting device according to claim 1 and a method according to claim 10. Preferred embodiments are disclosed in the dependent claims.

The lighting device according to the present invention comprises the following components:

a) A number N of at least four light emitters with different primary colors, i.e. with different emission spectra under comparable operating conditions (temperature, driving currents, etc). Each light emitter may be a single lamp or a combination of several, identical or distinct lamps. Moreover, it is understood that the light output of the whole lighting device is the superposition of the light output of all its N light emitters.

b) A target determination unit for determining a number of $1 \leq s < N$ secondary target values that are functionally related to the driving commands for the light emitters, wherein the term "secondary" is used to distinguish these derived target values from a number of $1 \leq p < N$ "primary" target values for the light output of the lighting device that are just provided to the device e.g. by a user or some higher level controller.

With respect to the total number (p+s) of (primary and secondary) target values and the number N of light emitters, three cases can be distinguished: If (p+s)>N, there are generally not enough independent control variables (i.e. primary colors) to match all target values; an optimal approximation of the target values can then be tried instead. If (p+s)=N, there is generally a unique set of driving commands of the light emitters by which the target values can be reproduced. The proposed lighting device is particularly suited to manage this case. Finally, if (p+s)<N, the available number of primary colors provides excess degrees of freedom. The target values can therefore generally be reproduced, but the control problem becomes non-trivial.

c) A driving unit for determining individual driving commands for the light emitters based on the aforementioned secondary and primary target values. The "driving commands" may for example represent the forward currents applied to Light Emitting Diodes (LEDs) at a particular voltage. Another important example of driving commands are the duty cycles with which light emitters are driven in a pulse width modulation (PWM) scheme, i.e. the fraction of time for which an electrical signal (e.g. a voltage or current) is switched on in an alternating binary on/off supply of said signal.

The lighting device has the advantage that it allows a comparatively simple and fast determination of the N individual driving commands for the light emitters as it introduces a number of s secondary target values that are used additionally to the number of p predetermined primary target values. The secondary target values therefore reduce the degrees of freedom in the choice of the driving commands, allowing a unique solution in the ideal case of (p+s)=N.

In general, the driving unit may implement any suitable (e.g. nonlinear) mapping of the (p+s) primary and secondary target values onto the N individual driving commands needed for the light emitters. In a preferred case, this mapping is linear, which means that the driving unit can comprise a "matrix multiplication module" for evaluating a linear relation between the vector of driving commands and a (p+s)-dimensional "target vector" that is derived from the primary and secondary target values. In the most simple case, the aforementioned target vector may simply comprise as components the primary and secondary target values. It is however also possible that there is some non-trivial mapping of these primary and/or secondary target values onto the components of the target vector. Thus the color point x, y and flux given as primary target values may for example be converted to the XYZ color coordinate system in the target vector. The matrix multiplication has the advantage that it can readily be implemented and evaluated in real-time. Moreover, the associated matrix can usually be obtained by a straightforward calibration procedure (comprising the switching-on of only one of the light emitters at a time and the measurement of the resulting operating parameters and light output) and a matrix conversion. It should be noted in this context that the possibility of a unique matrix inversion typically requires that (p+s)=N.

In a preferred embodiment of the invention, the target determination unit is designed such that it determines the secondary target values in dependence on the given primary target values. Thus it can be guaranteed that the secondary target values will not be in conflict with the primary target values, i.e. establish boundary conditions that cannot be fulfilled.

The secondary target values can in principle comprise any quantity that can be expressed as a function of the driving commands. Preferably, the secondary target values will depend linearly on the driving commands as this significantly simplifies the associated calculations. One particular example of a possible secondary target value is the power consumption of some or of all light emitters, i.e. the energy taken up per unit of time by the considered light emitters for the stimulation of their lighting emission. As the light emitters are typically driven by electrical power, the power consumption corresponds to the product of the applied voltage and current.

Practically important examples of possible primary target values are the color point and the flux of the lighting device.

There will usually be a plurality (or even a continuum) of possible secondary target values that are compatible with the possible driving commands, i.e. that can be generated by a suitable combination of driving commands. The target determination unit therefore preferably comprises a "range estimator" that can determine the range of allowable secondary target values that are by definition in accordance with the possible driving commands and with at least a subset of the primary target values. The allowable secondary target values may for example take into account that currents supplied to the light emitters have to range between zero and some upper limit.

In a preferred embodiment of the invention, the driving commands for the light emitters are duty cycles of a PWM. The driving commands can therefore only assume values between zero and one, corresponding to duty cycles of 0% (light emitters off) and 100% (light emitters continuously on). This provides a unique and known range for the driving commands which simplifies in the aforementioned embodiment the determination of the range of allowable secondary target values.

In a particular realization of the embodiment in which the target determination unit comprises a range estimator, the target determination unit selects a vector V of secondary target values from the allowable range (determined by the range estimator) according to the relation $$V=(\Phi_t/\Phi_x) \cdot V_x,$$

wherein $V_x$ is the vector of secondary target values from the allowable range that corresponds to a maximal associated primary target value $\Phi_x$, and wherein $\Phi_t$ is a given primary target value. As its symbol $\Phi$ indicates, the primary target value may particularly be the flux of the common light output of all light emitters. Once the range of allowable secondary target values is determined, a suitable set of secondary target values can readily be calculated by the given formula for any value of the considered primary target value $\Phi_t$.

In another variant of the embodiment comprising a range estimator, the range of allowable secondary target values is selected for given primary target values according to some optimization criterion. Typical examples of such an optimization criterion are the minimization of power consumption (of all or some light emitters) or the minimization of the highest duty cycle of all driving commands (in a PWM control).

While the light emitters may in principle be any kind of lamp (or group of lamps), it is preferred that they comprise LEDs, phosphor converted LEDs, organic LEDs (OLEDs), LASERs, phosphor converted LASERs, colored fluorescent lamps, filtered (colored) halogen lamps, filtered (colored) high intensity discharge (HID) lamps, and/or filtered (colored) Ultra High Performance (UHP) lamps.

The invention further relates to a method for controlling a lighting device comprising a number N of at least four light emitters with different primary colors, said method comprising the following steps:
a) Determining s<N secondary target values that are functionally related to the driving commands for the light emitters.
b) Determining individual driving commands for the light emitters based on the aforementioned secondary target values and on a number of p<N given primary target values for the light output of the lighting device.

The method comprises in general form the steps that can be executed with a lighting device of the kind described above. Therefore, reference is made to the preceding description for more information on the details, advantages and improvements of that method.

BRIEF DESCRIPTION OF THE DRAWINGS

These and other aspects of the invention will be apparent from and elucidated with reference to the embodiment(s) described hereinafter. These embodiments will be described by way of example with the help of the accompanying drawings in which:

FIGS. 2A-2J comprise formulae are related to the control approach of the present invention;

Like reference numbers in the Figures refer to identical or similar components.

DETAILED DESCRIPTION OF THE INVENTION

General lighting light sources need sufficiently high color rendering properties. Three primary colors are sufficient to make a light source which can generate light of nearly all colors including the white colors on the black body locus. Unfortunately the color rendering properties of such three color light sources are not very good. In order to improve the color rendering properties, a fourth color can be added, for example amber (A) to a red/green/blue (RGB) color system. If the colors on the black body locus are more important, one can also choose to add a white color source (W) instead of amber. With a white color source the maximum lumen output will generally be higher than with an amber source, still at the same or even better color rendering.

A typical user input for a lighting device is to supply color and flux coordinates in a color system like CIE1931 xyY or any other color system. The color control system of the lighting device should then be able to reproduce the color and luminous flux very accurately while maintaining a high Color Rendering Index (CRI).

Because color and flux always come with three parameters (i.e. xyY, uvY, XYZ, RGB, Lab, etc.), only three-color systems have one unique solution. The difficulty with four-color systems is that there is no unique solution; a linear sub-set of solutions all meet the color and flux requirement. The following examples describe an approach to use color systems with four or more colors for generating light of a certain color and luminous flux with the following advantages:
the whole color gamut of the primary colors can be utilized;
it can be used for color systems with primary colors for which at least one is inside and almost in the middle of the color gamut of the other colors, e.g. RGBW systems;
the theoretical absolute maximum luminous flux can be reached for every color in the color gamut;
it can optionally be optimized for lowest total electrical power or color perception independent of the required luminous flux and best life time;
The actual color rendering properties are mainly determined by the choice of the wavelengths of the primary colors. With commercially available RGBW LEDs, a color rendering index Ra8 of minimum 85 can be achieved without sacrificing the luminous flux too much.

Figure 1:
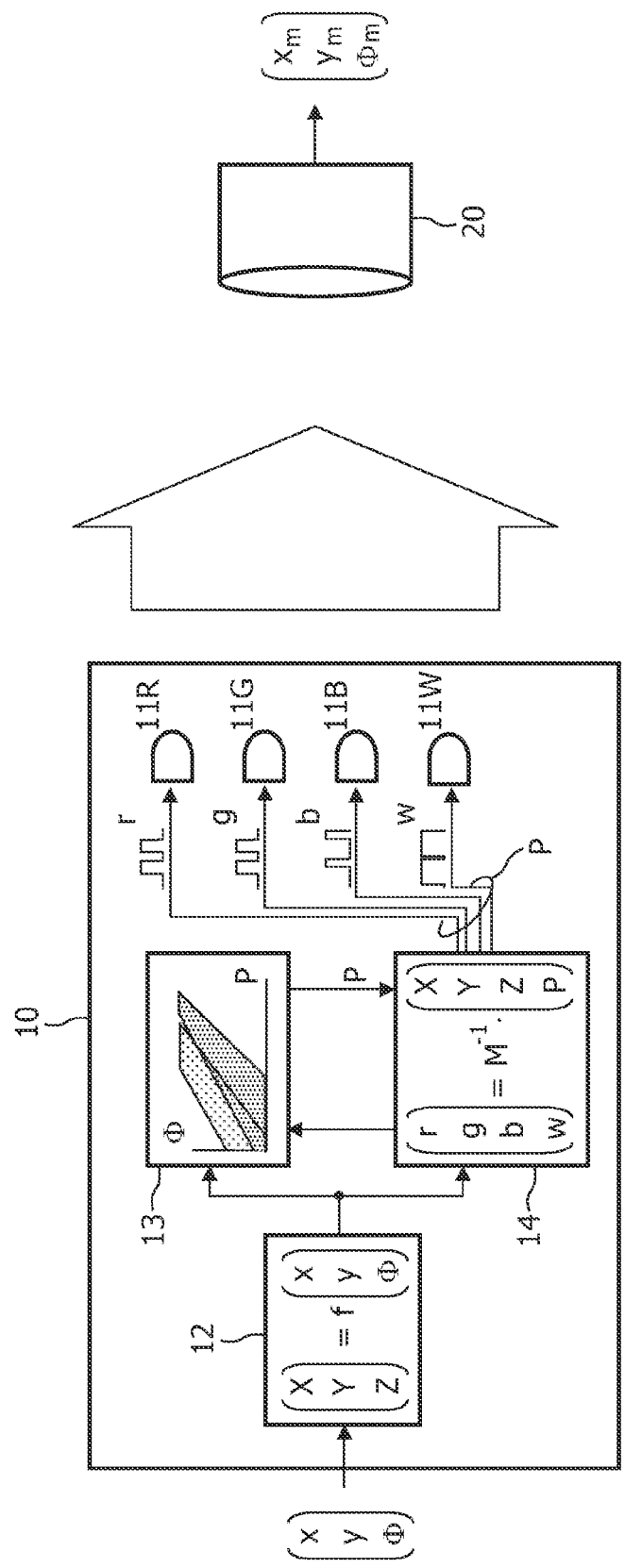
FIG. 1 schematically shows a lighting device according to the present invention.

FIG. 1 shows a lighting device 10 according to an exemplary embodiment of the present invention. The lighting device 10 comprises four light emitters of different colors, for example a red LED 11R, a green LED 11G, a blue LED 11B, and a white LED 11W. It should be noted, however, that other colors (e.g. amber instead of white) and/or additional colors could be used as well. The LEDs 11R-11W are individually driven using a pulse width modulation (PWM), wherein the control commands are the duty cycles r, g, b, and w for the LEDs 11R, 11,G, 11B, and 11W, respectively. The total electrical power that is delivered to the LEDs is denoted by the letter P. When activated, the four LEDs generate a common light output that can for example be measured by a spectrometer 20 for determining the actual values of the color point $x_m$, $y_m$ and the light flux $\Phi_m$ of the lighting device.

An important aspect of the lighting device 10 is the control scheme for determining the vector (r, g, b, w) of driving commands based on given "primary" target values that are provided e.g. by a user or some higher level controller. In the following, the desired color point x, y and the desired flux $\Phi$ will be considered as practically important examples of the primary target values, though other variables might be chosen as well.

The vector (x, y, $\Phi$) of primary target values is optionally first transformed in a "coordinate transformation unit" 12 to other coordinates. In the described example, the externally provided primary target values are based on the xyY CIE1931 color coordinate system and transformed by coordinate transformation unit 12 into the XYZ coordinate system. The corresponding relations are given in equation (1) of FIG. 2A (any citation of the equations will in the following refer to FIGS. 2A-2J).

The converted primary target values are then provided in parallel to a target determination unit 13 and a driving unit 14. As will be described in more detail below, the target determination unit 13 determines a "secondary target value" that is in accordance with the provided primary target values and the possible control commands r, g, b, w. The total power consumption P of the LEDs 11R-11W will in the following be considered as an example of the secondary target value, though other quantities could be used as well. To simplify the calculations, it is however preferred that the secondary target values are linearly dependent on the driving commands r, g, b, w, as is the case for the exemplary total power consumption P.

When calculating the power consumption target value P, the target determination unit 13 may make use of information stored in the driving unit 14. The main task of the driving unit 14 is however to determine the driving commands r, g, b, w based on the vector (X, Y, Z, P) of externally provided (converted) primary target values X, Y, Z and the power consumption target value P provided by the target determination unit 13. As will be explained in the following with reference to the expressions of FIGS. 2A-2J, the operation of the driving unit 13 may simply amount to a multiplication with a predetermined matrix $M^{-1}$.

In each lighting device with N primary colors, there is a unique mapping from the N control commands to a target vector comprising the color point coordinates x, y and the flux $\Phi$ of the device. In the linear case, this mapping is expressed by the "calibration matrix", which can for example be determined in a calibration procedure in which only one color at a time is activated and the resulting color point and flux are observed. For control purposes, the calibration matrix has to be inverted. An N-color system therefore needs an N×N calibration matrix because otherwise the inversion is not unique and cannot be solved. According to equation (2), the calibration matrix M in the considered RGBW system is therefore extended with values for the total electrical power P at 100% duty cycle. The vector of control commands (duty cycles r, g, b, w) can then be calculated with the help of the inverted calibration matrix, $M^{-1}$, from a given target tristimulus value XYZ and a total electrical power P as denoted in equation (3).

Now there is one difficulty: Only the target values X, Y, Z are fixed and known from the given primary target values x, y, Y=$\Phi$. The secondary target value of total electrical power P is however not known and must be provided in a different way. The matrix product is therefore rewritten as denoted in equations (4) and (5), i.e. as the sum of two vectors that are proportional to the target power consumption P and the target flux $\Phi$, respectively, wherein the components of the latter vector are given according to equation (5) by the calibration matrix and the target color values x, y.

It should be noted that dividing the terms in equation (4) by the power consumption P shows that at a certain value for the efficiency, $\Phi/P$=const., the relative ratios between the duty cycles r, g, b, w are constant with flux $\Phi$.

Now the condition has to be observed that the duty cycles r, g, b, w cannot be lower than 0% or higher than 100%. This leads to the inequality (6) that determines the range of allowable target power consumption values P in dependence on the target flux $\Phi$.

Figure 3:
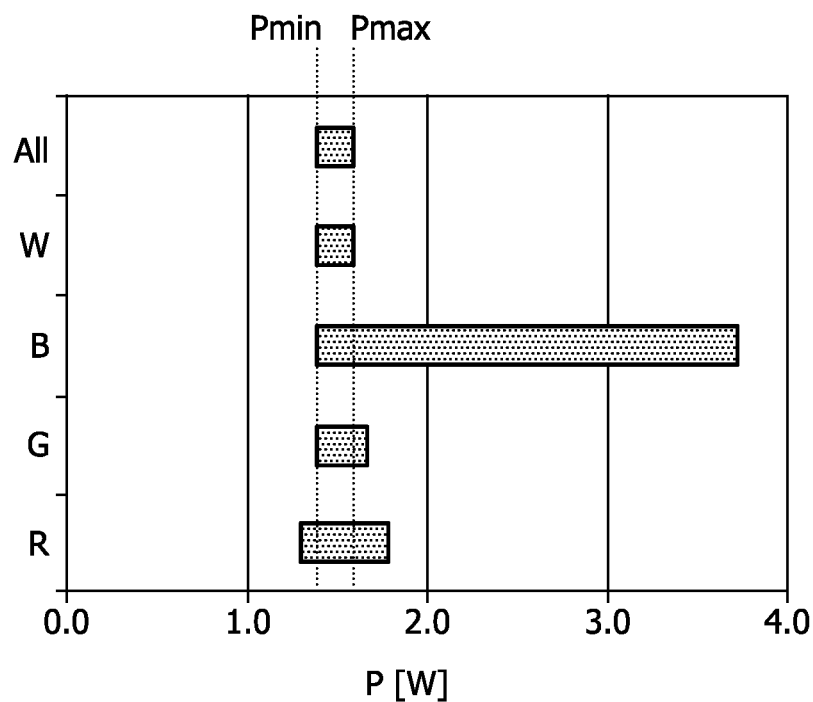
FIG. 3 illustrates an exemplary range of allowable power consumption values determined for a given flux value by a first control approach according to the present invention.

Inequality (6) will in the following first be examined for the case that the target flux $\Phi$ is considered as being fixed to its given value. For each of the four colors c=R, G, B, and W, an interval of allowable target power consumptions P is then determined by the inequalities $P_{min,c} \leq P \leq P_{max,c}$. FIG. 3 illustrates exemplary ranges of allowable target power consumptions P (further parameters for the colors R, G, B, W are: dominant wavelength $\lambda$d: R=604.8 nm, G=537.9 nm, B=452.6 nm; individual fluxes: R=32 lm, G=42 lm, B=9 lm, W=44 lm; CCT: W=5100K; the target color is at 4000K and the total luminous flux $\Phi$ is at 50 lm).

As the duty-cycle requirement must be met for every color, the actually allowable range of target power consumptions (indicated with index "All" in FIGS. 2A-2J) is the intersection of all intervals for the colors R, G, B, W, i.e. the interval from about Pmin=1.392 W to Pmax=1.592 W.

Figure 4:
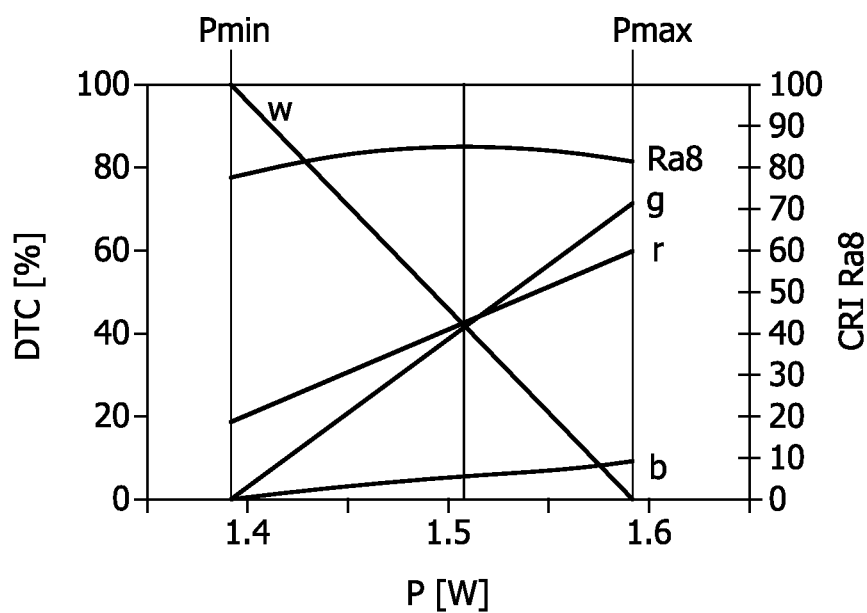
FIG. 4 shows the resulting duty cycles and color rendering index as a function of the chosen power consumption target value in the allowable range according to FIG. 3.

For every allowed power consumption P from the aforementioned interval there is a solution for the duty cycles r, g, b, w which yields a light output that matches the target tristimulus values X, Y, Z. FIG. 4 shows in a diagram these solutions for the duty cycles r, g, b, w ("DTC" on left vertical axis) and the associated Color Rendering Index (CRI Ra8 on right vertical axis). The lower limit Pmin and the upper limit Pmax are indicated by vertical dotted lines. The vertical central line (at about 1.51 W) marks the total electrical power where the highest duty cycle of all four duty cycles r, g, b, w is lowest.

Figure 5:
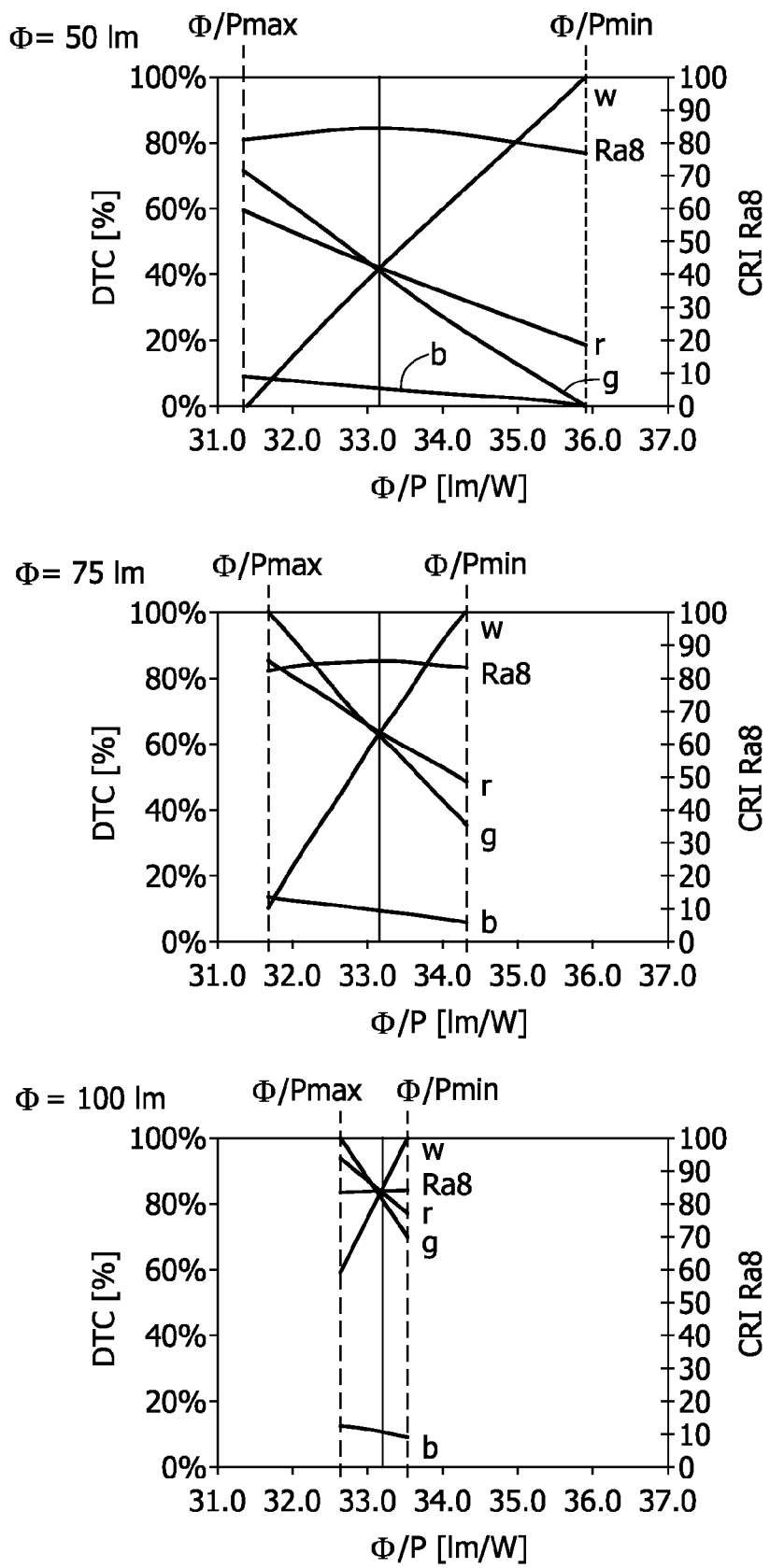
FIG. 5 shows similar diagrams like FIG. 4 for flux values of 50 lm (top), 75 lm (middle), and 100 lm (bottom)

In FIG. 5 the duty cycles r, g, b, w are plotted against the luminous efficiency, i.e. the total flux $\Phi$ per total power consumption P, at 50 lm (upper diagram), 75 lm (middle diagram) and 100 lm (lower diagram). All data refer to the same color setting (temperature effects are neglected), and the vertical axes have the same meaning as in the previous Figure. The diagrams show that the left and the right limit Pmin and Pmax shift with total flux $\Phi$ towards the central vertical line which stays at the same efficiency value (of about 33.1 lm/W). At the maximum possible flux, the left and right limits Pmin and Pmax will coincide with said vertical line. Thus even with the considered four color system, there is only one duty cycle solution for the maximum possible light output.

Above considerations lead to three potential beneficial choices for the still open degree of freedom, i.e. the variable P, which can be made:

1. Lowest Total Electrical Power

The lowest total electrical power corresponds to the left limit Pmin of FIG. 4 and to the right limits of FIG. 5. It has the benefit that the total heat dissipation is lowest, thus the heat sink temperature will be lowest. However, one of the four dyes, typically the white one, will be driven at maximal duty cycle of 100%. Therefore this dye has a relatively high temperature and will age faster than the other dyes. Another aspect is that the color rendering properties will be dependent on the required luminous flux; after all, when the required luminous flux increases, white stays at 100% and the other colors RGB come in proportionally which will change the color rendering properties. Moreover, when the calibration matrix is not exactly accurate, the mixed color will change with luminous flux.

2. Color Perception Constant with Flux

At the middle vertical line in FIGS. 4 and 5 the maximum duty cycle is lowest. This is the setting where the relative ratios between the duty cycles will be constant with flux until the maximum possible flux: When the flux changes, the duty cycles r, g, b, w of all colors change with the same ratio, i.e. when the flux doubles, then r doubles, g doubles, b doubles, and w doubles. The relative contribution of the four colors stays the same and as a result also the color rendering properties stay the same. Inaccuracies in the calibration matrix will not lead to color changes when the target luminous flux changes. Because the maximum duty cycle is lowest, for white target colors there is no primary color which is operated at a much higher level then the other colors. Since the life of the system is determined by the life of the fastest deteriorating color, this improves life of the whole system.

3. Best Color Rendering Properties

The color rendering properties are related to the relative contributions of the primary colors. Unfortunately it is not easy to calculate the Color Rendering Index CRI and to find the total electrical power setting where this CRI is highest because for this calculation the spectra of all colors are needed. Especially for small micro-controllers the computation time will be relatively long. However, a smart choice of the (dominating) wavelengths of the primary colors can force the CRI-optimum at about the same power setting as in the previous option. By the choice of the wavelengths this is accomplished for the example of FIG. 4.

For most applications the preferred choice is option 2, combined with a smart choice for the (dominating) wavelengths of the primary colors such that the color rendering properties are sufficiently good.

In the following, inequality system (6) will be examined in a second approach for the case that the target flux $\Phi$ is considered as having a variable value. One of the advantages of this approach is that it can adjust the target luminous flux to the maximum possible luminous flux while maintaining the same color coordinates in cases in which the given target luminous flux is higher than the maximum luminous flux.

Figure 6:
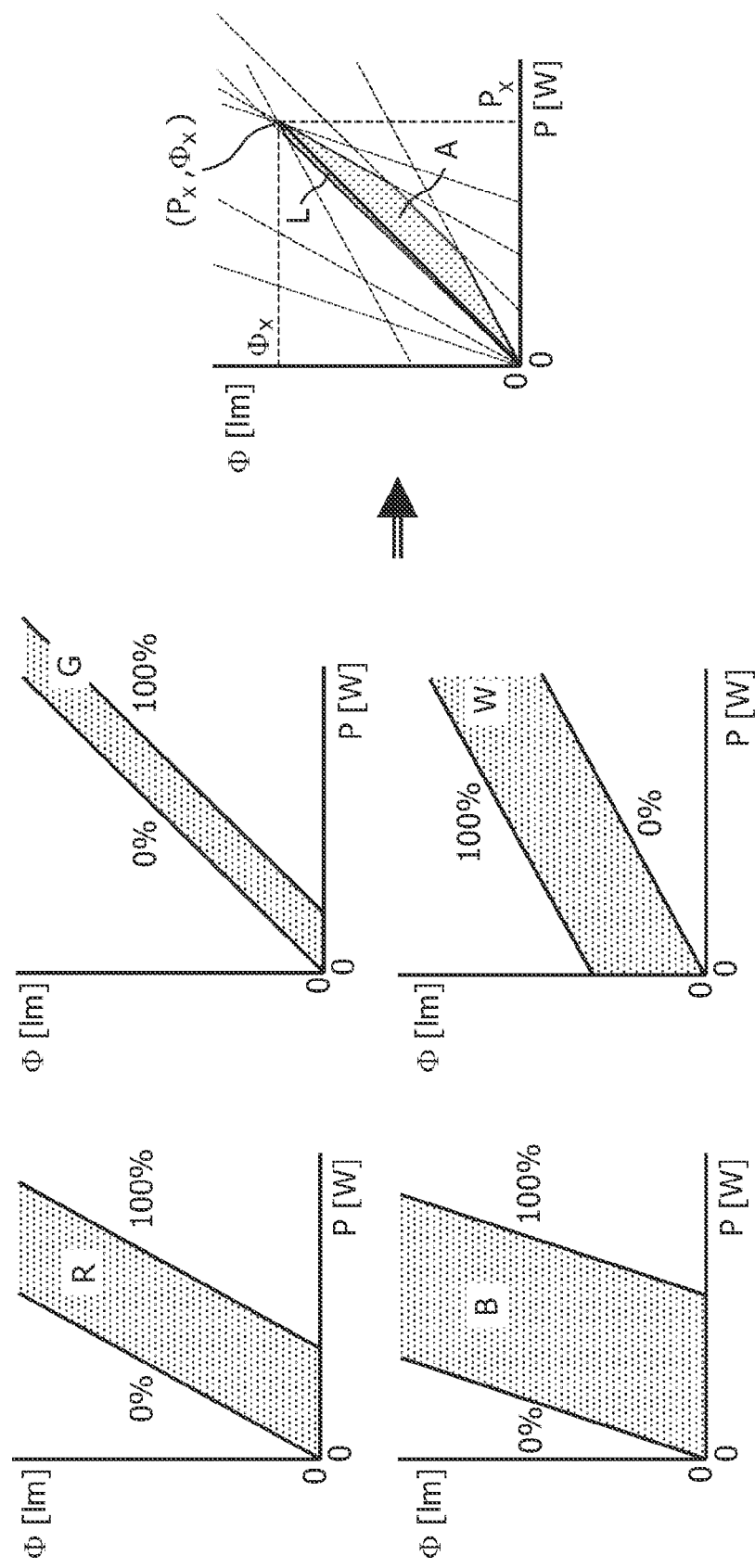
FIG. 6 illustrates an exemplary composition of the range of allowable power consumption values determined for arbitrary flux values by a second control approach according to the present invention.

When both the power consumption P and the total flux $\Phi$ are variable, inequality system (6) has to be represented in a (P,$\Phi$)-space as shown in FIG. 6. In this representation, each inequality of the system (6) corresponds to one of the inclined bands R, G, B, W in the four diagrams on the left hand side of the Figure and contains the (P,$\Phi$) tuples that are in accordance with the possible duty cycles for one color. Each band has two parallel edges; one goes through (0, 0) and belongs to duty cycle 0%, the other belongs to duty cycle 100%. Inside the band the duty cycle is between 0% and 100%. The width, angle, and position of the bands are defined by the calibration matrix M and the target color coordinates x, y according to equations (1) to (6), but not by the target luminous flux $\Phi$.

The overlap of the four bands is the area A depicted in the diagram on the right hand side of FIG. 6 where all colors satisfy the duty cycle condition (6). The solution for the target color and flux must therefore be somewhere in this area A.

In the approach discussed above with respect to FIGS. 3 to 5, the (P,$\Phi$)-space was reduced to a one-dimensional P-space by considering the diagrams of FIG. 6 only for the given flux target value $\Phi$=$\Phi_t$ (FIG. 3 corresponds for example to horizontal sections through the bands of FIG. 6 at the height $\Phi_t$). In the improved strategy considered now, the relative ratios between the duty cycles r, g, b, w which correspond to the maximum possible luminous flux $\Phi_x$ are determined first. As was already mentioned, the ratios of the duty cycles are independent of the flux $\Phi$ for a constant efficiency $\Phi$/P; the required solution will therefore be somewhere on the straight line L between (0, 0) and the corner point ($P_x$,$\Phi_x$) of the area A (as the efficiency is constant on this line L). The duty cycles which correspond to the corner point ($P_x$,$\Phi_x$) can be determined from equation (4). They are scaled in a final step according to equation (7) until the luminous flux equals the target value $\Phi_t$.

Equation (8) shows that the relative ratios between the duty cycles will be independent of the target luminous flux $\Phi_t$ (which ensures that the color perception will be independent of luminous flux), wherein the subscript x denotes the setting at the maximum possible luminous flux $\Phi_x$ and t the setting at the target luminous flux $\Phi_t$.

The equation also shows that the condition for the duty cycles is automatically fulfilled when the target luminous flux is lower than or equal to the maximum luminous flux.

The point ($P_x$,$\Phi_x$) with the highest luminous flux can be found by first calculating all points of intersection between the bands of FIG. 6, and then discriminating for the point with the highest luminous flux $\Phi_x$ still lying on all bands. For example the four points of intersection between the bands corresponding to red and green can be calculated from equation (9), wherein $c_r$ and $c_g$ are constants which can be 0 or 1 corresponding to duty cycle 0% and 100% respectively.

It can be checked if the intersection point lies on the other bands by calculating the "distance" from the intersection point (P, $\Phi$) to both edges of the band under test. This is expressed in equation (10) for the example of the band corresponding to blue. Here $c_b$ determines the edge under test ($c_b$=0 for the edge corresponding to 0% duty cycle, and $c_b$=1 corresponding to 100%). If the signs of the distances $v_0$ and $v_1$ are unequal then the intersection point under test is located in the band under test.

The technology described above can be applied to LED fixtures using any combination of four colors, including white. It is especially suitable for general lighting, but may also be applied in other application areas where lumen output and color rendering is very important. Moreover, it was already pointed out that the algorithm needs one independent variable to search for the best working point with the highest luminous flux. Though this was the power consumption P in the above examples, it might be any other variable which is linear with the duty cycle.

Furthermore, the method can be extended to 5, 6, ... N basic colors (=duty cycles) by finding the best working point in a multidimensional space. Five colors need for example two independent variables P1, P2; the graphical representation of the bands in the two-dimensional (P,$\Phi$)-space used above for four colors must then be replaced by a kind of solid bands in a three-dimensional (P1,P2,$\Phi$)-space. Similarly, every extra color adds one dimension to the (P1,P2,P3, ... , $\Phi$)-space.

Finally it is pointed out that in the present application the term "comprising" does not exclude other elements or steps, that "a" or "an" does not exclude a plurality, and that a single processor or other unit may fulfill the functions of several means. The invention resides in each and every novel characteristic feature and each and every combination of characteristic features. Moreover, reference signs in the claims shall not be construed as limiting their scope.

The invention claimed is:

1. A lighting device comprising:
    a) a number of N≧4 light emitters with different primary colors;
    b) a target determination unit for determining a number of s<N secondary target values that are functionally related to driving commands for the light emitters; and
    c) a driving unit for determining individual driving commands for the light emitters based on the secondary target values and on a number of p<N given primary target values for the light output of the lighting device, the driving commands comprising duty cycles of a pulse width modulation,
    wherein the target determination unit is configured to determine a range of allowable secondary target values in accordance with the driving commands.

2. The lighting device according to claim 1, characterized in that the driving unit comprises a matrix multiplication module for evaluating a linear relation between the vector of driving commands and a target vector derived from the primary and secondary target values.

3. The lighting device according to claim 1, characterized in that the target determination unit determines the secondary target values in dependence on the given primary target values.

4. The lighting device according to claim 1, characterized in that the secondary target values comprise the power consumption of a subset of the light emitters and/or that the primary target values comprise the color point and flux of the lighting device.

5. The lighting device according to claim 1, characterized in that the target determination unit comprises a range estimator for determining a range of the primary target values that are in accordance with the allowable driving commands and at least a subset of the given primary target values.

6. The lighting device according to claim 5, characterized in that the target determination unit selects a vector V of secondary target values from the allowable range according to the relation $V=(PHI_t/PHI_x)V_x$, with $V_x$ being the vector of secondary target values from the allowable range that corresponds to a maximal primary target value $PHI_x$ and with $PHI_t$ being a given primary target value.

7. The lighting device according to claim 5, characterized in that the target determination unit selects for given primary target values the secondary target values from the allowable range according to some optimization criterion, particularly according to a minimization of power consumption or a minimization of the highest duty cycle driving command.

8. The lighting device according to claim 1, characterized in that the light emitters comprise a LED, phosphor converted LED, organic LED (OLED), LASER, phosphor converted LASER, colored fluorescent lamp, filtered halogen lamp, filtered high intensity discharge (HID) lamp, and/or filtered UHP lamp.

9. A method for controlling a lighting device comprising a number of N≧4 light emitters with different primary colors, comprising the steps of
    a) determining s<N secondary target values that are functionally related to driving commands for the light emitters, the driving commands comprising duty cycles of a pulse width modulation; and
    b) determining individual driving commands for the light emitters based on the secondary target values and on a number of p<N given primary target values for the light output of the lighting device,
    wherein determining secondary target values further comprises determining a range of allowable secondary target values in accordance with the driving commands.

* * * * *